United States Patent Office 3,227,224
Patented Jan. 4, 1966

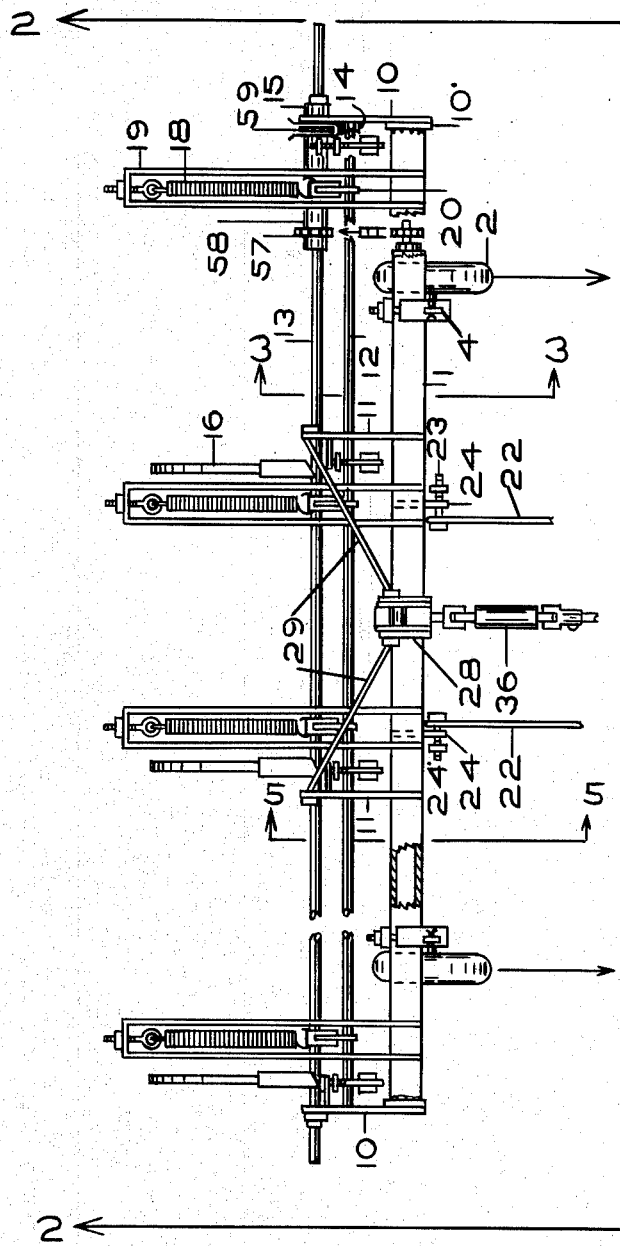

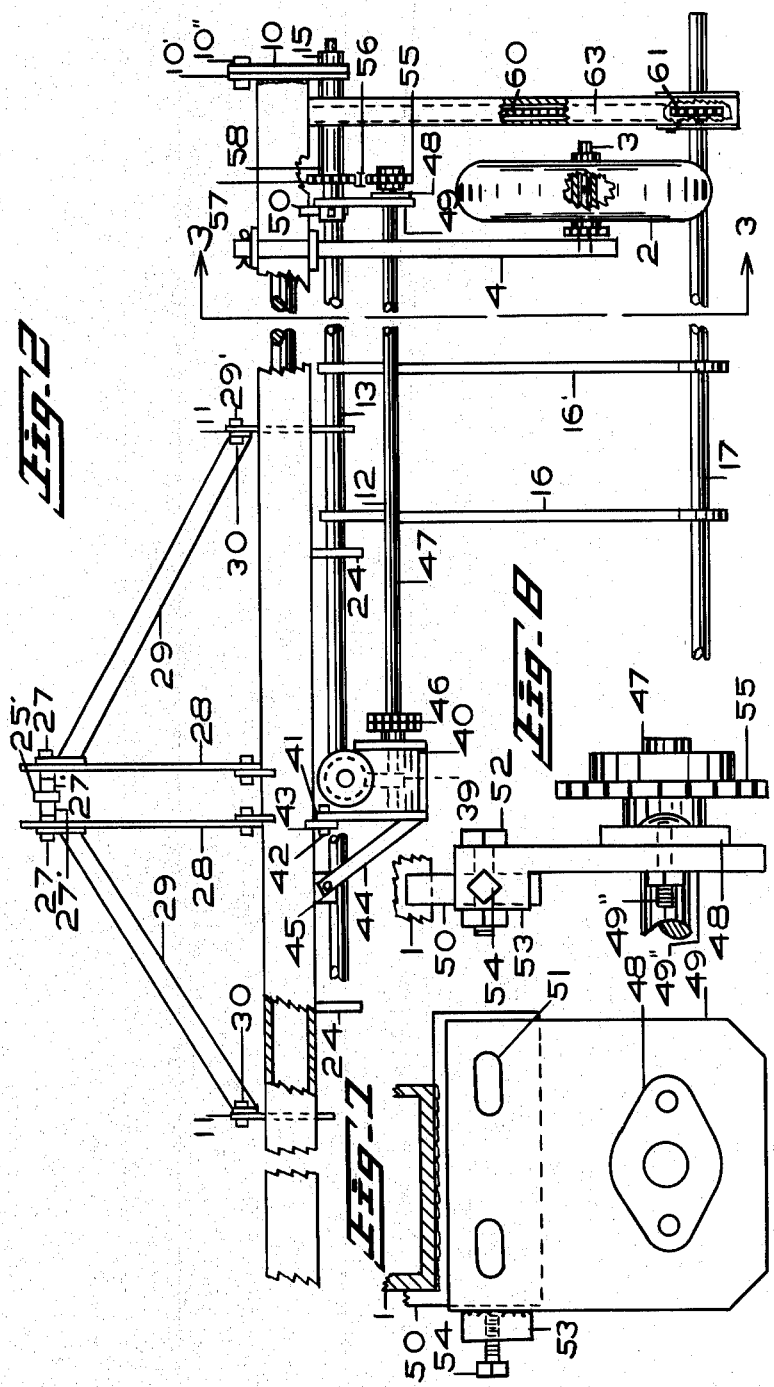

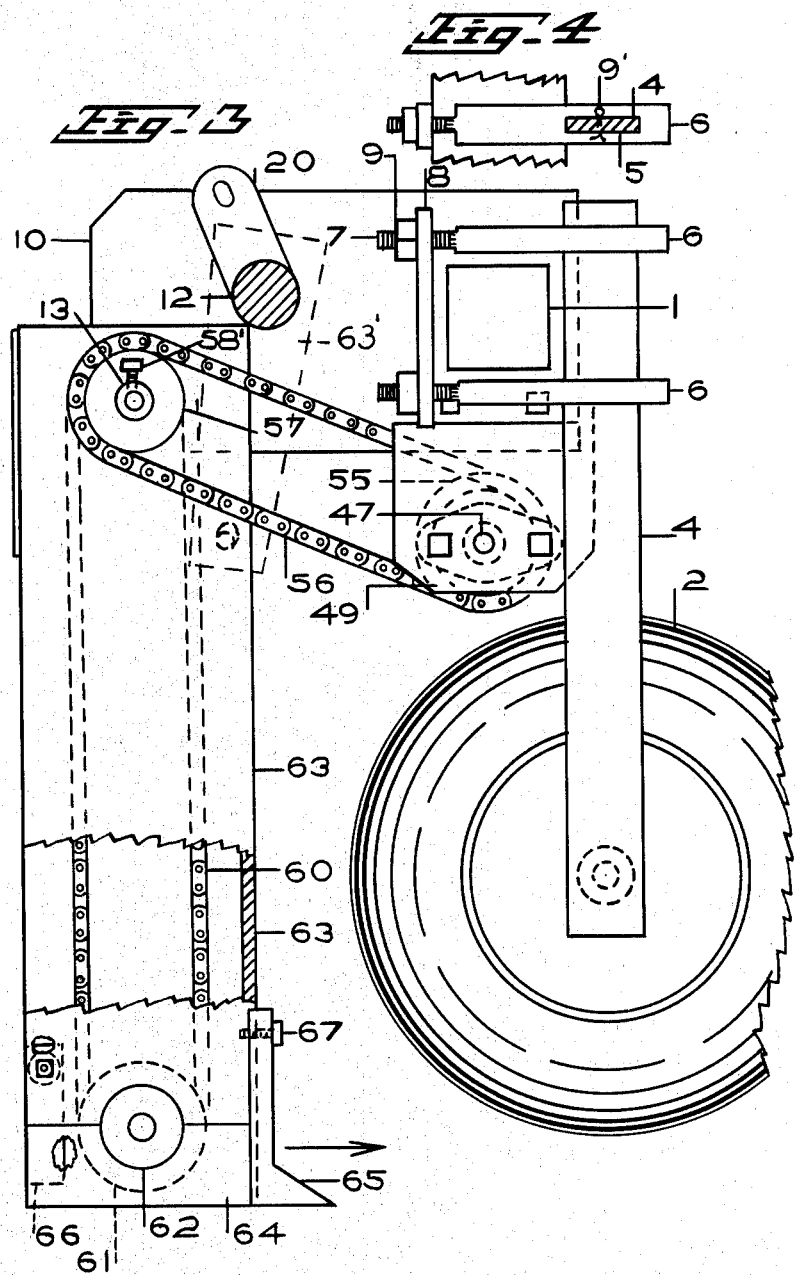

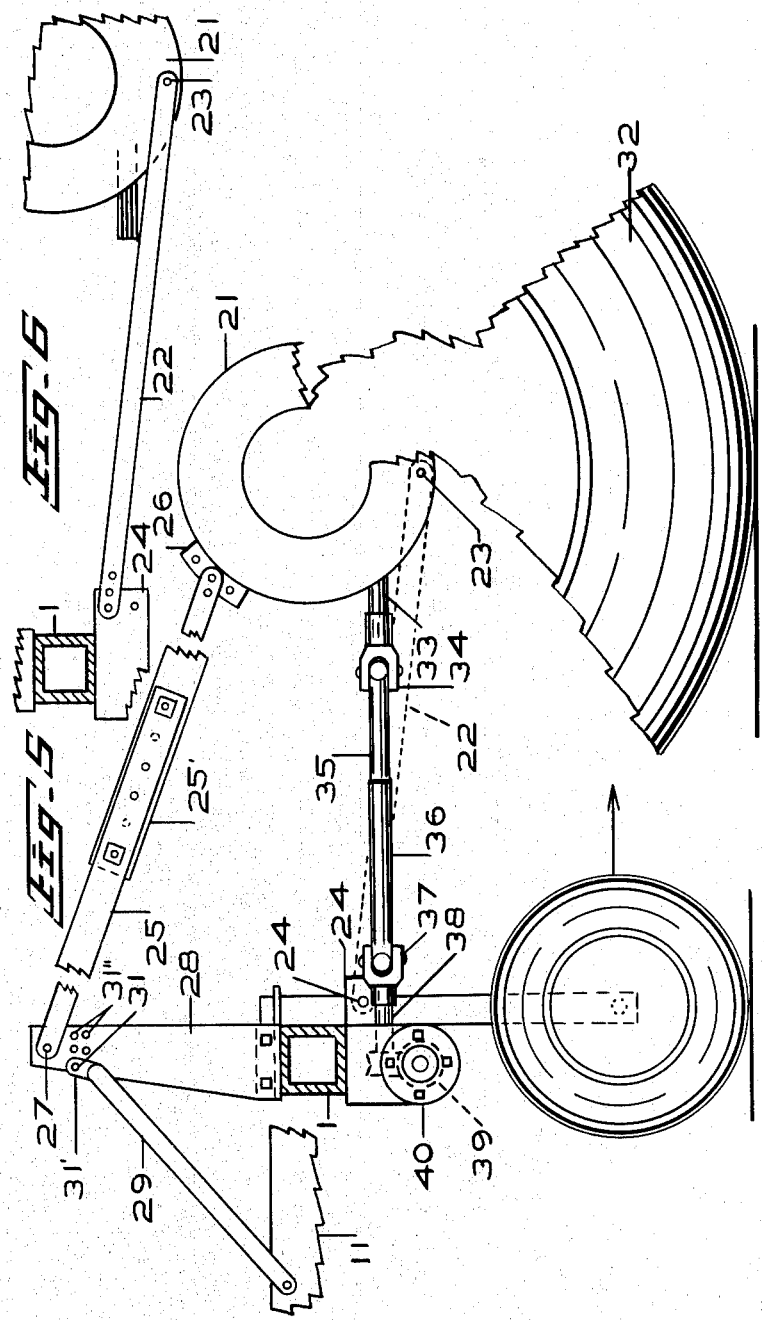

3,227,224
THREE POINT HITCH AND DRIVING CONNECTION TO A ROTARY ROD WEEDER
George Henry Morris, 37 6th Ave. N., Yorkton, Saskatchewan, Canada
Filed June 8, 1964, Ser. No. 373,352
1 Claim. (Cl. 172—44)

This invention relates to rotary rod weeders, having particular reference to a rod weeder for operation off a three point hitch tractor and using a power take-off drive from the tractor.

In the art to which the invention relates rod weeders are more usually attached in following relation to tractors and the rotary rod driven from the weeder ground wheels. Machines of this character, however, are not suitable for use in small fields or in corners.

The present device is concerned with providing a rod weeder attachable to a three point hitch tractor and utilizing the power take-off drive from the tractor, giving the machine greater manoeuvreability, and in addition making it capable of being quickly changed between working and transport positions.

Other features and advantages of the invention will become apparent by reference to the accompanying description taken in conjunction with the drawings.

In the drawings, wherein is illustrated a preferred embodiment of the invention, FIG. 1 is a top plan view of a machine embodying the changes and improvements adapting a rod weeder for attachment in following relation to a tractor using a three point hitch, including a power take-off from the tractor, shown in part broken away and in part sectioned.

FIG. 2 is a somewhat enlarged front view of the machine taken on a line 2—2 of FIGURE 1, showing the drive connections to the weeder rod and with parts broken away and parts in section, and the working parts of the left side of the machine omitted for convenience of illustration.

FIG. 3 is an enlarged side view taken from the line 3—3 of FIGURE 1, showing the mounting of a ground wheel and the leg drive.

FIG. 4 is a top plan view of the clamp attaching a vertical depth control ground wheel mounting bar to the main frame bar of the machine, and including a fragment of the main frame bar.

FIG. 5 is an enlarged side view, taken on a line 5—5 of FIGURE 1, showing the three point hitch connection from the tractor to the rod weeder, including parts of the tractor shown broken away, and with parts of the rod weeder omitted, and in part broken away and in section.

FIG. 6 is an enlarged side view of one of the hitch elements between the tractor and rod weeder, including fragments of the tractor and weeder, and showing the weeder frame bar in section.

FIG. 7 is an enlarged side view of the mounting plate for the weeder rod connecting drive shaft, and including a fragment in section of the main frame bar.

FIG. 8 is a front view of the mounting plate for the weeder rod connecting drive shaft, and including a fragment of the main frame bar, and the drive shaft broken away, with the sprocket for the driving connection from the shaft.

Having reference to the drawings, at 1 is indicated the main frame cross bar of the weeder, this bar mounting on depth control wheels 2 (FIGS. 2 and 3) that include axle shafts 3 to which they are fixed, as by welding, vertical bars 4 that engage in slots 5 (FIG. 4) in clamping bars 6. The clamping bars include threaded ends 7 engaging a plate 8 and are secured by nuts 9 for attaching the clamping bars to the frame bar 1 with the vertical bars held frictionally engaged against the frame bar. The vertical bars are endwise adjustable in the clamping bars to provide depth control for the weeder rod, and they may be held against sliding out of the clamping bars by cotter pins, as at 9'.

To the ends of the frame bar 1 rearwardly extending end plates 10 (FIG. 2) are attached by bolts 10" to plates 10', which are fixed, as by welding, to the frame bar. Also fixed to the frame bar 1 (FIG. 1) are rearwardly extending intermediate plates 11 that have mounted free to turn therein a rocker shaft 12. The rocker shaft is tubular and engages on stubs, as at 14 (FIG. 1) fixed forward on the plates 10, and a gang shaft 13 is pivotally mounted at the lower rear of the plates 10 and 11, and is held therein by collars 15 (FIG. 2) that would be fixed to the shaft, as by set screws.

On the gang shaft are securely fixed shanks 16 carrying a weeder rod 17, and the gang shaft is held by springs 18 (FIG. 1) engaged by brackets 19 fixed rearwardly extending from the frame bar 1, the springs attaching to radial arms 20 (FIGS. 1 and 3) on the rocker shaft 12. The number of shanks may vary in accordance with the width of the weeder, an additional shank 16' being included in FIG. 2, which can be omitted or included as required.

The three point hitch connection from the tractor includes hydraulically controlled hitch bars 22 pivotally attaching by a bolt and sleeve at 23 (FIG. 6) to the tractor rear axle differential 21, with the rear ends of the bars 22 (FIGS. 1 and 5) attaching by bolts 24' to plates 24 (FIGS. 2 and 5) on the frame bar 1. A lengthwise adjustable stabilizer bar 25 forwardly attaches by a pin 27 to vertical supports 28 between the supports and held (FIG. 2) by spacers 27'. The bar 25 is lengthwise adjustable at 25'. The support bars 28 are mounted upstanding on the frame bar 1 (FIGS. 2 and 5) and are braced by rods 29 that have bent lower ends 30 that attach by bolts 29' to the plates 11, and at their upper ends by bolts 31 engaging bent ends 31' of the rods, and for which there are extra bolt holes 31" for adjustment. This provides means for levelling the weeder fore and aft for both operating and traveling. At 32 is indicated a fragment of the tractor wheel.

The power take-off from the tractor is indicated at 33 (FIG. 5) and this connects by a universal coupling 34, rod 35 slidable in a sleeve 36, universal coupling 37, and a shaft 38 to a worm gear at 39 in a gear box 40. The gear box attaches by a plate 41 (FIG. 2), bolts 42 and a lug 43 to the frame bar.

From the worm gear the power is transmitted with a reduction of ten to one through a flexible joint 46 (FIG. 2) and shaft 47, the shaft mounting at its outer end in a bearing 48 (FIGS. 2, 7 and 8) carried by a plate 49 attached by bolts 49' and suspended adjustable on a plate 50 fixed to the frame bar 1, the plates 49 and 50 having slotted openings 51 for engagement of bolts 52 attaching the plate 49 to the plate 50. The plate 49 includes an integral offset 53 in which is threaded a set screw 54 bearing against the plate 50.

The shaft 47 (FIGS. 2 and 3) is connected by a sprocket 55 and chain 56 in driving relation to a sprocket at 57 fixed to a sleeve 58 by a set screw 58', the sleeve being free to turn on the gang shaft 13. The sleeve 58 connects by a sprocket 59 (FIG. 1), and by a chain 60 (FIG. 3) to rotate a sprocket 61 (FIG. 2) in driving relation to the weeder rod 17, the rod being turned oppositely to the ground wheels. Additional to the shanks 16 the weeder rod is carried in a bearing 62, that is mounted in the lower end of a leg 63 suspended securely fixed to the gang shaft 13. The leg 63 would be connected to the radial arm 20 (FIG. 3) with link means 63' (shown in dotted outline), by which the leg would be linked to the rocker shaft 12 corresponding to the connection of the shanks to be turned thereby or to turn the shaft.

The leg 63 carries a foot 64 (FIG. 3) to which is fixed a point 65, the foot attaching to the leg by a plate 66 fixed to the foot and bolted to the leg, and by a set screw 67 attaching the point to the leg. The bearing 62 is mounted in a circular opening formed half in the leg and half in the foot.

In the use of the implement, the power take-off from the tractor shaft 33 is connected to drive the shaft 47, which by the sprockets 57 and the chain 56 drives the sleeve 58, from which by the sprocket 59, chain 60 and the sprocket 61 the weeder rod is driven, this eliminating a ground wheel drive for the weeder rod.

The chain 56 may be tightened by loosening the bolts 52 attaching the plate 49 (FIGS. 7 and 8) to the plate 50 and by shifting the plate 49 by the set screw 54.

The hitch to the tractor is by the draft bars 22 to the frame bar 1, the draft bars attaching to the plates 24, and by the stabilizer bar 25 that connects to the vertical supports 28 by the pin 27 providing means for leveling the weeder, in addition to which the weeder may be vertically adjusted or controlled by the mounting of the vertical ground wheel bars 4 in the clamping bars 6.

I claim:

A rotary rod weeder for attachment in following relation to a tractor, comprising: a main transverse frame bar adjustably supported on wheels; a pair of spaced forward hitch plates and a pair of spaced upstanding supports on the frame bar; a gear box mounted centrally of and below the frame bar, and having a drive shaft extending transversely from the mechanism therein, and said shaft rotatably mounted parallel beneath the frame bar; a gang shaft and a rocker shaft both pivotally mounted in spaced relation on and parallel with the frame bar; radial arms on the rocker shaft; downwardly extending shanks on the gang shaft, rotatably supporting a transverse weeder rod therebelow; a hollow leg between the gang shaft and the weeder rod; spring means on the frame bar, co-acting with the radial arms, and linkage between the leg and rocker shaft, for resilient holding of the weeder rod in normal operating position; a sleeve rotatably mounted on the gang shaft, and extending into the leg; drive means between the drive shaft and the sleeve; flexible means for angularly deflecting the drive shaft; drive means between the sleeve and the weeder rod, operable within the leg; a pair of hitch bars, each having one end thereof pivotally connected to one of said hitch plates, and their other ends pivotally connectable to the tractor; a lengthwise adjustable stabilizer bar, having one end thereof pivotally connected between the upper ends of said supports, and the opposite end of said stabilizer bar pivotally connectable to the tractor; and a universal coupling for rotatably connecting the mechanism of the gear box with the power take-off of the tractor.

References Cited by the Examiner

UNITED STATES PATENTS

| 1,815,331 | 7/1931 | Robinson | 172—44 |
| 2,379,469 | 7/1945 | Bagan | 172—47 X |
| 2,562,486 | 7/1951 | Denning | 173—448 X |
| 2,751,737 | 6/1956 | Herod | 172—47 X |
| 2,954,085 | 9/1960 | Roberts | 172—44 |
| 3,072,198 | 1/1963 | Calkins et al. | 172—44 |
| 3,135,338 | 6/1964 | Morris | 172—44 |

FOREIGN PATENTS 35,621   10/1929   France.

ABRAHAM G. STONE, *Primary Examiner.*

F. B. HENRY, *Assistant Examiner.*